T. HOFSTATTER, Jr.
AUGER.
No. 62,849. Patented Mar. 12, 1867.
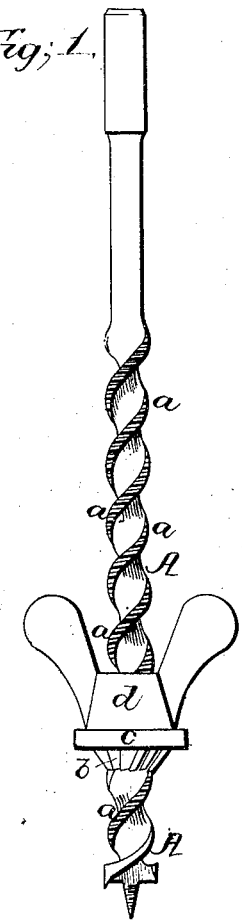
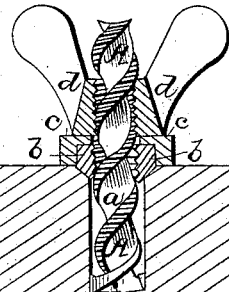

United States Patent Office.

THEODORE HOFSTATTER, JR., OF NEW YORK, N. Y.

Letters Patent No. 62,849, dated March 12, 1867.

---

IMPROVEMENT IN AUGERS.

---

The Schedule referred to in these Letters Patent and making part of the same.

---

TO ALL WHOM IT MAY CONCERN:

Be it known that I, THEODORE HOFSTATTER, Jr., of the city, county, and State of New York, have invented new and useful Improvements in Augers; and I do hereby declare that the following is a full, clear, and exact description thereof, which will enable others skilled in the art to make and use the same, reference being had to the accompanying drawings, forming part of this specification, in which—

Figure 1 represents a side view of my invention.

Figure 2 is a side view of the same partly in section.

Similar letters of reference indicate like parts.

The object of this invention is to provide an auger attachment, whereby the same may be adjusted to bore holes of any required depth; and whereby, also, when desired, the holes may be countersunk.

The invention consists in cutting a screw-thread upon the edges of the twist, so that a countersink and a thumb-screw, with intervening square or angular washer, may be secured thereon at any desired place, so that thereby the auger may be set to make a hole of any desired length, and to countersink the same, thereby combining the two tools, auger and countersink, into one, which is superior to the same on account of its compactness, and because of its being adjustable.

A is a common screw auger, the edges of the twist on which are provided with a screw-thread, $a$, as shown, so that the countersink $b$, washer $c$, and thumb-screw $d$, may be set and held thereon at any desired place. The thread is cut on before the metal is tempered, as it would be too difficult to do so on the hard steel. The countersink $b$ is a nut, the outer edge of which is provided with cutting edges, similar to those used on the commonly-used countersink. This tool is screwed upon the auger to the required depth, and then the washer $c$, which fits loosely around the auger, is laid over it. The thumb-screw $d$ is then screwed against the washer, and all the parts are thereby held firmly in the required place. The countersink and washer may be omitted, if it is desired only to gauge the depth of the hole.

What I claim as new, and desire to secure by Letters Patent, is—

The countersink $b$, washer $c$, and thumb-screw $d$, when constructed and arranged upon the screw-thread $a$ of the auger A, and operating as herein set forth for the purpose specified.

TH. HOFSTATTER, JR.

Witnesses:
WM. F. MCNAMARA,
ALEX. F. ROBERTS.